UNITED STATES PATENT OFFICE.

JOSEF HAWLICZEK, OF LIVERPOOL, COUNTY OF LANCASTER, ENGLAND, ASSIGNOR TO HIMSELF AND NEIL MATHIESON, OF SAME PLACE.

MANUFACTURE OF BICARBONATE OF SODA.

SPECIFICATION forming part of Letters Patent No. 357,824, dated February 15, 1887.

Application filed October 19, 1886. Serial No. 216,666. (No specimens.) Patented in England January 6, 1886, No. 227.

*To all whom it may concern:*

Be it known that I, JOSEF HAWLICZEK, chemist, a subject of the Emperor of Austria, and residing at 40 Bentley Road, Liverpool, in the county of Lancaster, England, have invented certain new and useful Improvements in the Manufacture of Bicarbonate of Soda and Soda-Ash, (for which Neil Mathieson and myself, the said JOSEF HAWLICZEK, have applied for a patent in Great Britain on the 6th of January, 1886, No. 227,) of which the following is a specification.

This invention has for its object the manufacture of either pure bicarbonate of soda or of pure monocarbonate of soda (soda-ash) direct from the crude carbonate of sodium liquors, commonly called "vat-liquor" or (after the deposition of the soda salts by boiling) "red liquor," or from crude carbonate of sodium, commonly called "black ash," all of the Le Blanc process, or from a solution of crude sulphide of sodium, or for obtaining pure sodium bicarbonate from the crude bicarbonate of the ammonia-soda process.

I find that if to a solution of chlorides or sulphates of an alkali—such as sodium, potassium, or ammonium—there be added a solution of crude carbonate of soda, commonly called "vat-liquor," and the mixture be submitted to the action of carbonic-acid gas, as hereinafter described, pure bicarbonate of soda is precipitated in a crystalline form, which may be easily separated from the above-mentioned chloride or sulphate liquor by filtration, or by the use of a hydro-extractor or other well-known means of separating liquids from solids. The chloride or sulphate liquor left in contact with the bicarbonate may be got rid of by washing the latter with water.

One method of carrying out this invention is to mix a solution of sodium carbonate, called "vat-liquor," with a strong solution of sodium chloride. A second mode is to use a solution of sodium chloride or brine direct for lixiviating the crude sodium carbonate, usually termed "black ash." When I lixiviate direct with brine, I use the brine of such a strength that the resulting solution of carbonate and chloride is most suitable for precipitating the bicarbonate therefrom by carbonic-acid gas, so that the brine can be used over and over again. The mixture of brine and crude carbonate of sodium is now ready for the first treatment with carbonic-acid gas, and I call this first treatment the "purifying process." By this treatment I get rid of certain impurities in the black-ash liquor, such as alumina, silica, and iron. This purification of the liquor is one of the main points of my invention, as by this treatment impurities are got rid of which, if allowed to remain, would render it impossible to manufacture pure soda products of good color.

The said purifying process may be performed in any suitable vessel, but I prefer to use a cylindrical iron vessel, which is provided with shelves for the distribution of the carbonic-acid gas. I preferably use the carbonic-acid gas which is passing over from the "absorption column," being the excess of the carbonic-acid gas used for the precipitation of the pure bicarbonate, as hereinafter described. By this purifying treatment the alumina, silica, and iron are precipitated, and after the solution is filtered I obtain a clear liquor free from these impurities and ready for the precipitation of the pure bicarbonate of soda. To effect this precipitation I subject the purified liquor to the further action of a current of carbonic-acid gas. This operation is preferably performed in a high cylindrical tower provided with compartments and gas-distributers for the purpose of insuring the mixing of the liquor with the carbonic-acid gas. In this apparatus, which I call the "absorbing column," the precipitation of the pure bicarbonate takes place.

I have found that during the precipitation of the pure bicarbonate the carbonic-acid gas has a very marked action on the sulphides and cyanides remaining in the liquor. These compounds are, by the second treatment with the carbonic-acid gas, decomposed, precipitating the equivalent quantity of sodium bicarbonate with the evolution of sulphureted hydrogen and cyanogen. After the precipitation of bicarbonate has taken place I allow the liquor, with the bicarbonate, to run onto an ordinary vacuum-filter, or I use a hydro-extractor, in order to separate the bicarbonate from the chloride liquor. The bicarbonate is then washed with a quantity of water sufficient to remove any chloride liquor which may be left in contact therewith. The bicarbonate is now in chemically pure state, or nearly so, and is either by drying converted into pure marketable bicarbonate of soda or by calcining into pure monocarbonate, (soda-ash.) The liquor remaining consists mostly of sodium chloride, and can be used over again for lixiviating fresh black ash.

To make pure bicarbonate from crude bicarbonate of soda produced by the ammonia-soda process, I preferably dissolve the crude bicarbonate direct in a solution of sodium chloride or sulphate, or a mixture of both, of a suitable strength, and subject this liquor to a similar treatment with carbonic-acid gas, by which means I precipitate bicarbonate of soda in a purified condition.

If a solution of crude sulphide of sodium be treated in the way above described and the mixture subjected to the action of carbonic-acid gas, the sulphide of sodium is decomposed, sodium bicarbonate is precipitated, and sulphureted hydrogen is evolved. The sodium bicarbonate thus obtained, when further treated as hereinbefore described, can be either converted into pure marketable bicarbonate of soda or by calcination into pure soda-ash.

The sulphureted hydrogen resulting from the decomposition of the aforesaid sodium sulphide can either be burned for manufacturing sulphuric acid or be utilized by any known means.

I claim—

1. The processes, substantially as herein described, for manufacturing pure sodium bicarbonate or pure soda-ash direct from the crude substances herein mentioned—namely, (a) the vat or red liquor of the Le Blanc process mixed with a solution of chloride or sulphate of sodium or other alkali metal, (b) a crude sulphide of sodium solution similarly mixed, (c) the solution from lixiviating the black ash of the Le Blanc process with a solution of chloride or sulphate of sodium or other alkali metal, or (d) the solution from dissolving the crude bicarbonate of the ammonia-soda process with a solution of chloride or sulphate of sodium or other alkali metal, and by such treatment precipitating the sodium as bicarbonate, this bicarbonate being roasted for soda-ash when desired, as set forth.

2. The purification of crude carbonate of sodium or crude sulphide of sodium, when in admixture with chloride or sulphate of sodium liquor, (or liquor of other chloride or sulphate of an alkali,) by means of carbonic-acid gas applied before the precipitation of the bicarbonate, substantially as hereinbefore described.

3. The improvement in soda manufacture, consisting in preparing a crude carbonate or sulphide of sodium solution having dissolved therein, also, a quantity of a chloride or sulphate of sodium or other alkali metal, and treating the prepared solution with carbonic-acid gas in two stages, the impurities precipitated in the first stage being separated and the sodium being precipitated as bicarbonate in the second stage, substantially as described.

In testimony whereof I have signed my name to this specification in the presence of two subscribing witnesses.

JOSEF HAWLICZEK.

Witnesses:
JOHN ROBINSON,
   1 *Old Hall Street, Liverpool.*
W. J. SULIS,
   *U. S. Consulate, Liverpool.*